United States Patent
Ballingall et al.

(10) Patent No.: US 12,439,502 B2
(45) Date of Patent: Oct. 7, 2025

(54) INTRINSICALLY SAFE ELECTRICAL CONNECTOR

(71) Applicant: Connector Technologies Pty Ltd, Malaga (AU)

(72) Inventors: Shane Ballingall, Malaga (AU); Jose De Andrade, Malaga (AU); Richard Kabzinski, Malaga (AU); Karl Rosewarne, Malaga (AU); Ryan Willis, Malaga (AU)

(73) Assignee: Connector Technologies Pty Ltd, Malaga (AU)

( * ) Notice: Subject to any disclaimer, the term of this patent is extended or adjusted under 35 U.S.C. 154(b) by 263 days.

(21) Appl. No.: 18/030,451

(22) PCT Filed: Oct. 4, 2021

(86) PCT No.: PCT/AU2021/051156
§ 371 (c)(1),
(2) Date: Apr. 5, 2023

(87) PCT Pub. No.: WO2022/073060
PCT Pub. Date: Apr. 14, 2022

(65) Prior Publication Data
US 2023/0292424 A1 Sep. 14, 2023

(30) Foreign Application Priority Data
Oct. 6, 2020 (AU) .................. 2020903612

(51) Int. Cl.
*H05B 45/30* (2020.01)
*H02J 50/10* (2016.01)
(Continued)

(52) U.S. Cl.
CPC .............. *H05B 47/20* (2020.01); *H02J 50/10* (2016.02); *H02M 3/335* (2013.01)

(58) Field of Classification Search
CPC ........ H05B 45/30; H05B 45/36; H05B 45/37; H05B 45/39; H02M 1/007; H02M 1/44;
(Continued)

(56) References Cited

U.S. PATENT DOCUMENTS 5,385,476 A * 1/1995 Jasper ................ H01R 13/6633
439/38
5,942,859 A * 8/1999 Okude ............... H05B 41/2855
315/307

(Continued)

OTHER PUBLICATIONS

"International Search Report"; prepared for application No. PCT/AU2021/051156; authorized officer Dr. Forhad Zaman; Nov. 12, 2021; 6 pages.

*Primary Examiner* — Tung X Le
(74) *Attorney, Agent, or Firm* — Jackson Walker LLP (57) ABSTRACT

Provided is an electrical connector (10) comprising supply side and load side housings (12) and (30 that are connectable by means of female socket (22) and male plug (32). The connector (10) includes an AC input (14) with input protection (18) for receiving an AC supply (16), a primary rectifier arrangement (20) configured to rectify the AC input (14) to a DC input, a female socket (22) having a single layer air-cored supply coil (24) sealed within the socket (22), and a capacitor arranged in series with the supply coil (24) to form a series resonant LC arrangement (26). Also included is a half-bridge resonant converter switched mode power supply arrangement (28) supplied from the DC input and driving the supply coil (24) to produce a symmetrical AC waveform, said converter configured with a switching frequency substantially matched to a resonant frequency of the series resonant LC arrangement. Power is transferrable to load coil (34) sealed within male plug (32), which includes a secondary rectifier arrangement (36) configured to rectify (Continued)

an AC waveform induced within the load coil (34) to produce a DC output for supply to a load (40).

15 Claims, 5 Drawing Sheets (51) Int. Cl.
*H02M 3/335* (2006.01)
*H05B 47/20* (2020.01)

(58) Field of Classification Search
CPC ... H02M 1/327; H01R 13/447; H01R 13/622; H01R 13/6633; H01F 38/14; Y10S 439/95
See application file for complete search history.

(56) References Cited

U.S. PATENT DOCUMENTS

| | | | | |
|---|---|---|---|---|
| 6,160,374 | A * | 12/2000 | Hayes | H02J 50/12 |
| | | | | 320/108 |
| 6,215,255 | B1 * | 4/2001 | Kim | H05B 41/2855 |
| | | | | 315/DIG. 4 |
| 9,973,099 | B2 * | 5/2018 | Ye | H02M 3/33576 |
| 2007/0072462 | A1 * | 3/2007 | Nakano | H01R 12/707 |
| | | | | 439/157 |
| 2007/0076459 | A1 | 4/2007 | Limpkin | |
| 2008/0094837 | A1 * | 4/2008 | Dobbins | F21V 23/02 |
| | | | | 362/249.01 |
| 2011/0254377 | A1 | 10/2011 | Wildmer et al. | |
| 2015/0244175 | A1 * | 8/2015 | Abe | G06F 1/26 |
| | | | | 307/104 |
| 2017/0126281 | A1 | 5/2017 | Cook et al. | |

\* cited by examiner

INTRINSICALLY SAFE ELECTRICAL CONNECTOR

TECHNICAL FIELD

This invention broadly relates to the field of electrical safety, and more specifically to an intrinsically safe electrical connector, and a light fitting comprising an intrinsically safe electrical connector.

BACKGROUND ART

The following discussion of the background art is intended to facilitate an understanding of the present invention only. The discussion is not an acknowledgement or admission that any of the material referred to is or was part of the common general knowledge as at the priority date of the application.

A variety of electrical connectors are known in the art, serving a host of different needs. The simplest electrical connections often comprise conductor-to-conductor connections, where electrical conductors are brought into contact in order to transfer electrical energy through a physical connection. Examples hereof are typical household sockets into which suitable electrical plugs are plugged.

Applicant has identified a need in the art of lighting fixtures, particularly for industrial lighting, where replacement or maintenance of lights often necessitate electrical isolation. Various industrial areas require electrical isolation when maintenance takes place, where no part of a live or powered connection or terminal may be exposed to the atmosphere at any time. Such electrical isolation is often subject to legal regulation, making it mandatory.

Where such regulation exists, in order to perform any maintenance, personnel must first isolate all power from the equipment being worked on or have a mechanism that allows the equipment to be removed from the power supply prior to being dismantled and worked on. For example, mining operations and hazardous industrial environments, where combustible materials or vapours may be present, often require complete electrical isolation in order to perform any maintenance on equipment.

The time required to carry out such electrical isolation can be substantial and costly as specially trained electricians are often required. In addition, electrical isolation generally requires any and all equipment on the same electrical network in the area to be disconnected or isolated, often resulting in shutdown of industrial processes even for mundane maintenance, such as replacing faulty lights. Even relatively short interruptions to unaffected industrial processes, such as mining plants, can lead to significant financial losses. For example, if refinement of mining ore is interrupted for an hour, and such mining ore is saleable at a certain value per tonne, then refinement of hundreds or even thousands of tonnes of material may be interrupted, resulting in significant monetary losses.

The current invention was conceived in an attempt to address the shortcomings in the art of minimising interruptions to industrial processes from electrical isolation when, for example, replacing lights.

SUMMARY OF THE INVENTION

According to an aspect of the invention there is provided an electrical connector comprising:
a supply side housing comprising:
  i) an AC input with input protection for receiving an AC supply;
  ii) a primary rectifier arrangement configured to rectify the AC input to a DC input;
  iii) a female socket having a single layer air-cored supply coil sealed within the socket, a capacitor arranged in series with the supply coil to form a series resonant LC arrangement; and
  iv) a half-bridge resonant converter switched mode power supply arrangement supplied from the DC input and driving the supply coil to produce a symmetrical AC waveform, said converter configured with a switching frequency substantially matched to a resonant frequency of the series resonant LC arrangement; and
a load side housing comprising:
  a) a male plug configured to fit inside the female socket and having a single layer air-cored load coil sealed within said plug; and
  b) a secondary rectifier arrangement configured to rectify an AC waveform induced within the load coil to produce a DC output for supply to a load;
wherein the supply and load side housings are complementarily engageable via the plug and socket so that electrical power transfer is facilitated from the AC input to the DC output through electromagnetic induction via the sealed supply and load coils.

The skilled addressee will appreciate that both the supply and load side housings are generally electrically sealed such that no electrical connector is open or exposed to the outside atmosphere when the connector is used.

Typically, the AC input is configured to receive an AC supply between 95-250 VAC.

Typically, the input protection comprises a fuse, an inrush current limiting thermistor and/or a metal oxide varistor.

In an embodiment, the AC input includes an electromagnetic interference (EMI) filter to mitigate EMI from the resonant converter arrangement back into the AC supply.

Typically, the EMI filter comprises a common-mode choke arrangement.

Typically, the primary rectifier arrangement comprises a diode bridge rectifier with capacitor.

Typically, the resonant converter arrangement drives the supply coil via pulse width modulation.

Typically, the switching frequency of the resonant converter arrangement is in a range of 150 kHz to several megahertz.

In an embodiment, the resonant converter switched mode power supply arrangement is configured to automatically and continuously monitor and adjust the switching frequency to maintain maximum power transfer to the secondary rectifier arrangement.

Typically, the secondary rectifier arrangement comprises a fast-recovery diode bridge with capacitor.

In an embodiment, the secondary rectifier arrangement includes tracking circuitry configured to automatically track a magnitude and/or frequency of the AC supply.

In an embodiment, the resonant converter arrangement includes load detection circuitry configured to detect if the load coil is in electromagnetic induction registry with the supply coil in order to activate or deactivate the resonant converter arrangement accordingly.

In an embodiment, the supply and/or load side housings are manufactured from a polymer material having suitable thermal conductivity to facilitate heat dissipation from the connector.

In an embodiment, the supply and/or load side housings define heat dissipation structures thereon, such as ribs or fins, to facilitate heat dissipation from the connector.

In an embodiment, the connector includes a fastener for securing the supply and load side housings together so that the plug is complementarily engaged within the socket to facilitate power transfer.

Typically, the load comprises a lighting arrangement, such as a light emitting diode (LED) lighting arrangement, a high intensity discharge (HID) lighting arrangement, a halide and/or sodium lamp.

According to a further aspect of the invention there is provided a light fitting comprising and electrical connector comprising:
  a supply side housing comprising:
    i) an AC input with input protection for receiving an AC supply;
    ii) a primary rectifier arrangement configured to rectify the AC input to a DC input;
    iii) a female socket having a single layer air-cored supply coil sealed within the socket, a capacitor arranged in series with the supply coil to form a series resonant LC arrangement; and
    iv) a half-bridge resonant converter switched mode power supply arrangement supplied from the DC input and driving the supply coil to produce a symmetrical AC waveform, said converter configured with a switching frequency substantially matched to a resonant frequency of the series resonant LC arrangement; and
  a load side housing comprising:
    a) a male plug configured to fit inside the female socket and having a single layer air-cored load coil sealed within said plug; and
    b) a secondary rectifier arrangement configured to rectify an AC waveform induced within the load coil to produce a DC output for supply to a lighting arrangement;
wherein the supply and load side housings are complementarily engageable via the plug and socket so that electrical power transfer is facilitated from the AC input to the DC output through electromagnetic induction via the sealed supply and load coils.

According to a further aspect of the invention there is provided an intrinsically safe electrical connector and/or a light fitting comprising such an intrinsically safe electrical connector, substantially as herein described and/or illustrated.

BRIEF DESCRIPTION OF THE DRAWINGS

The description will be made with reference to the accompanying drawings in which.

DETAILED DESCRIPTION OF EMBODIMENTS

Figure 1:
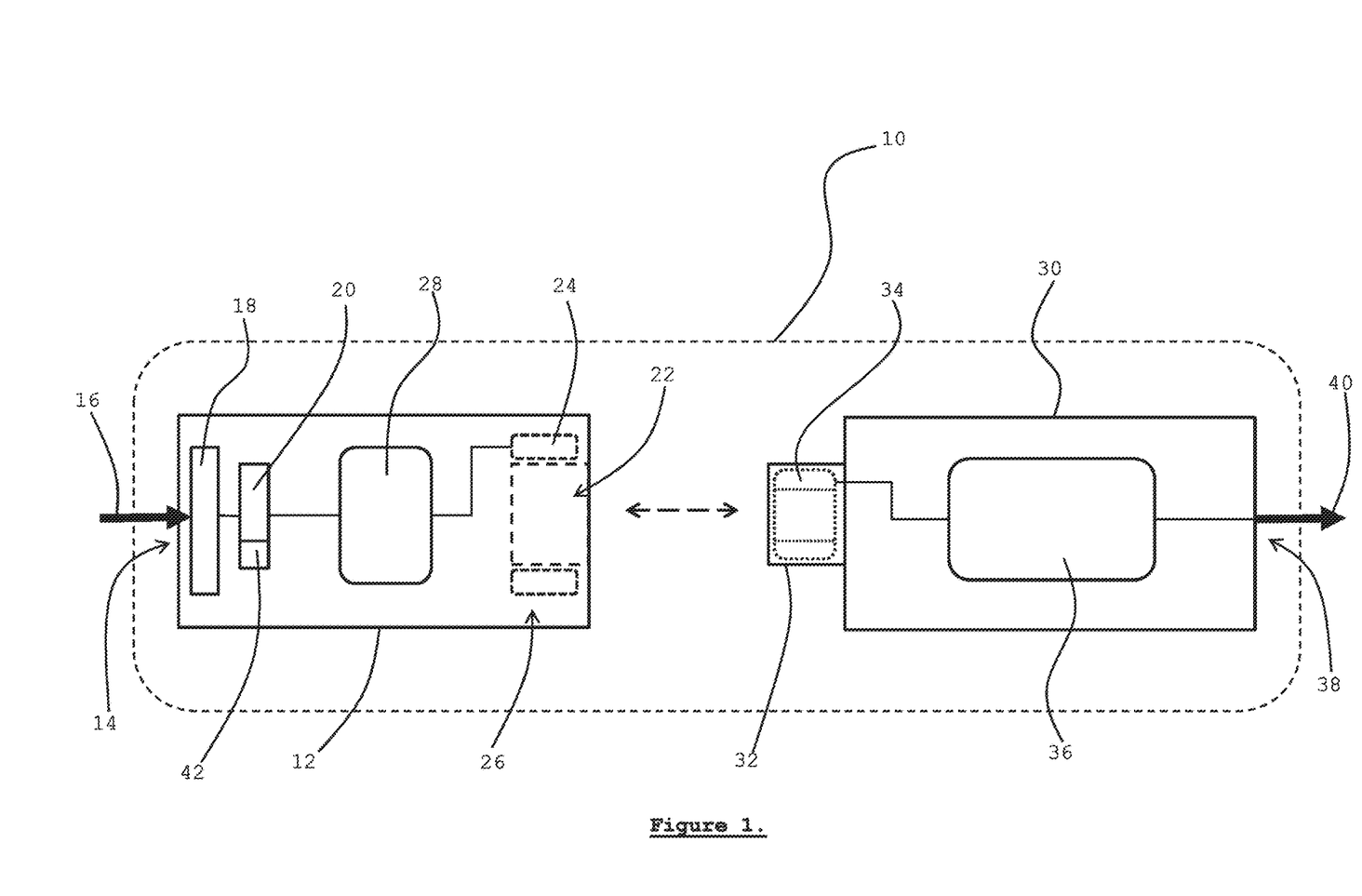
FIG. 1 is a diagrammatic representation of an intrinsically safe electrical connector arrangement, in accordance with an aspect of the present invention.
Figure 2:
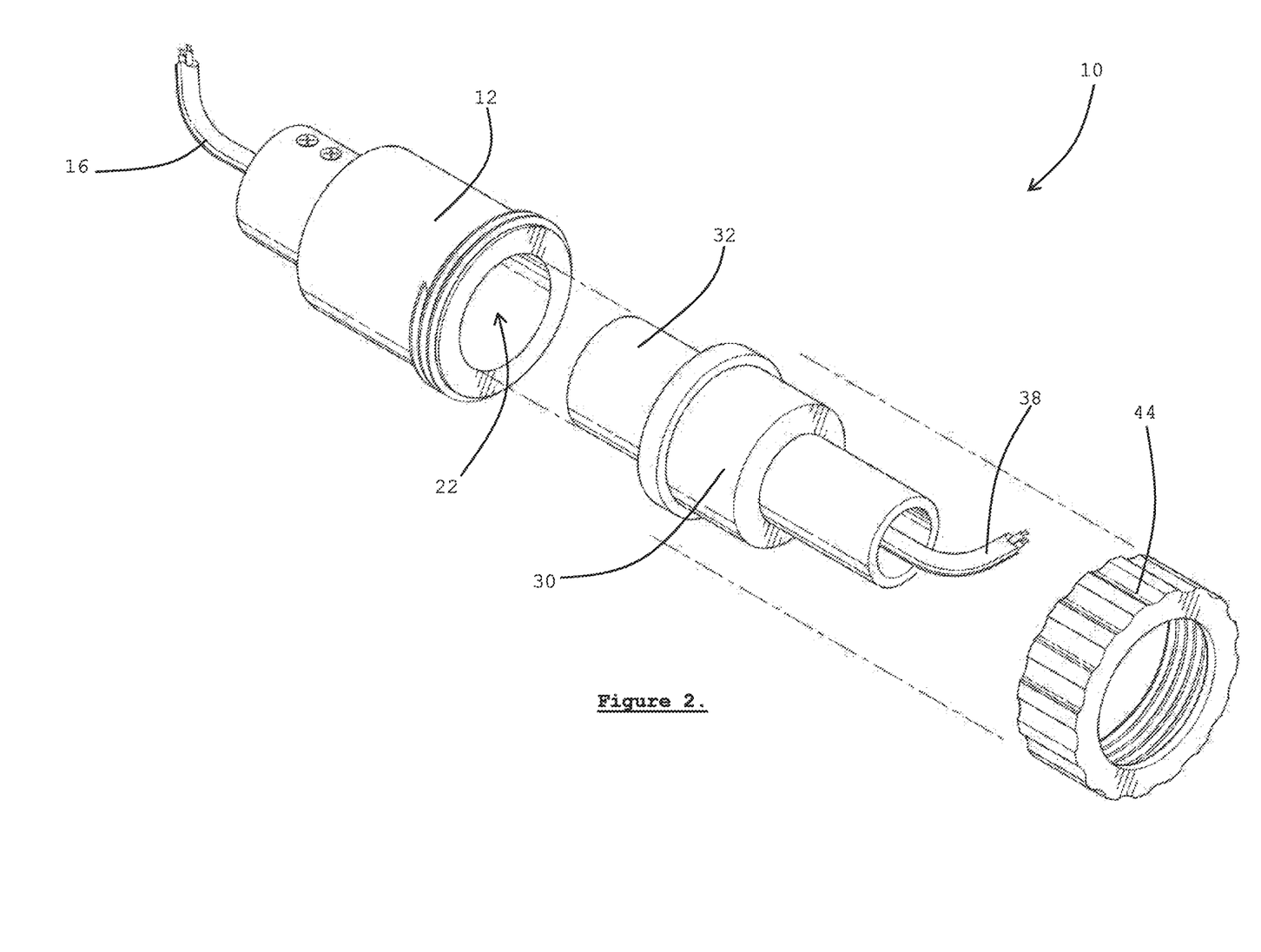
FIG. 2 is a diagrammatic perspective-view representation of one embodiment of supply side and load side housings of the electrical connector, in accordance with aspects of the present invention.
Figure 3A:
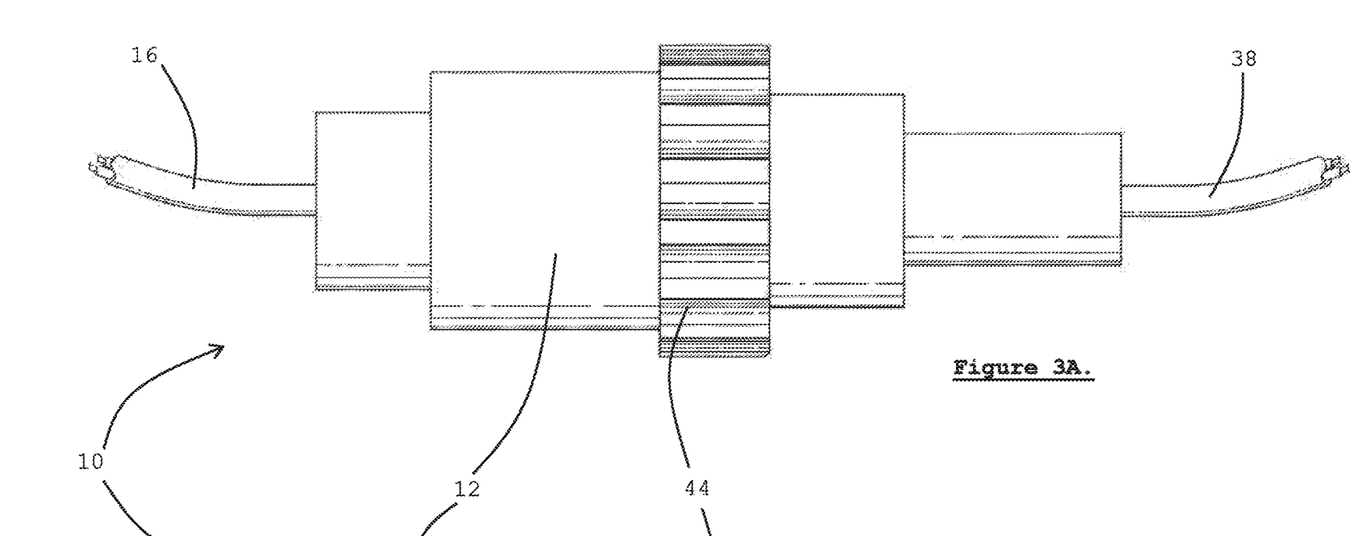
FIG. 3A is diagrammatic side-view representation of the electrical connector of FIG. 2, showing the supply and load side housings engaged with each other.
Figure 3B:
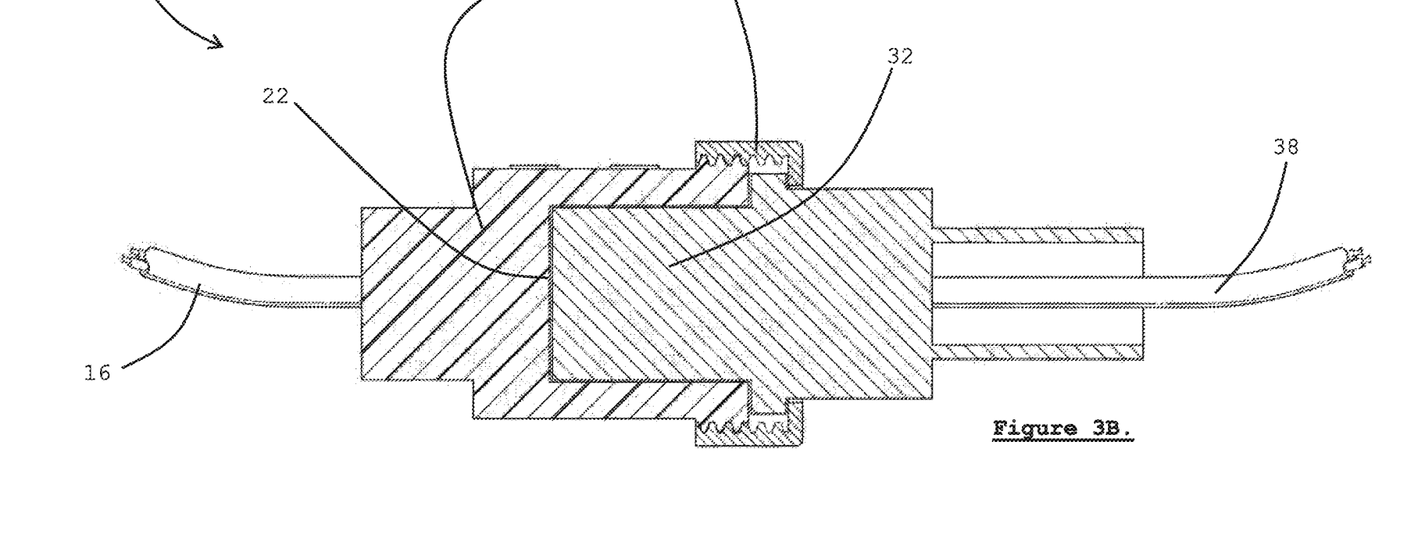
FIG. 3B is a diagrammatic side-sectional representation of the electrical connector of FIG. 3A, showing the male plug of the load side housing engaged with the female socket of the supply side housing.
Figure 4:
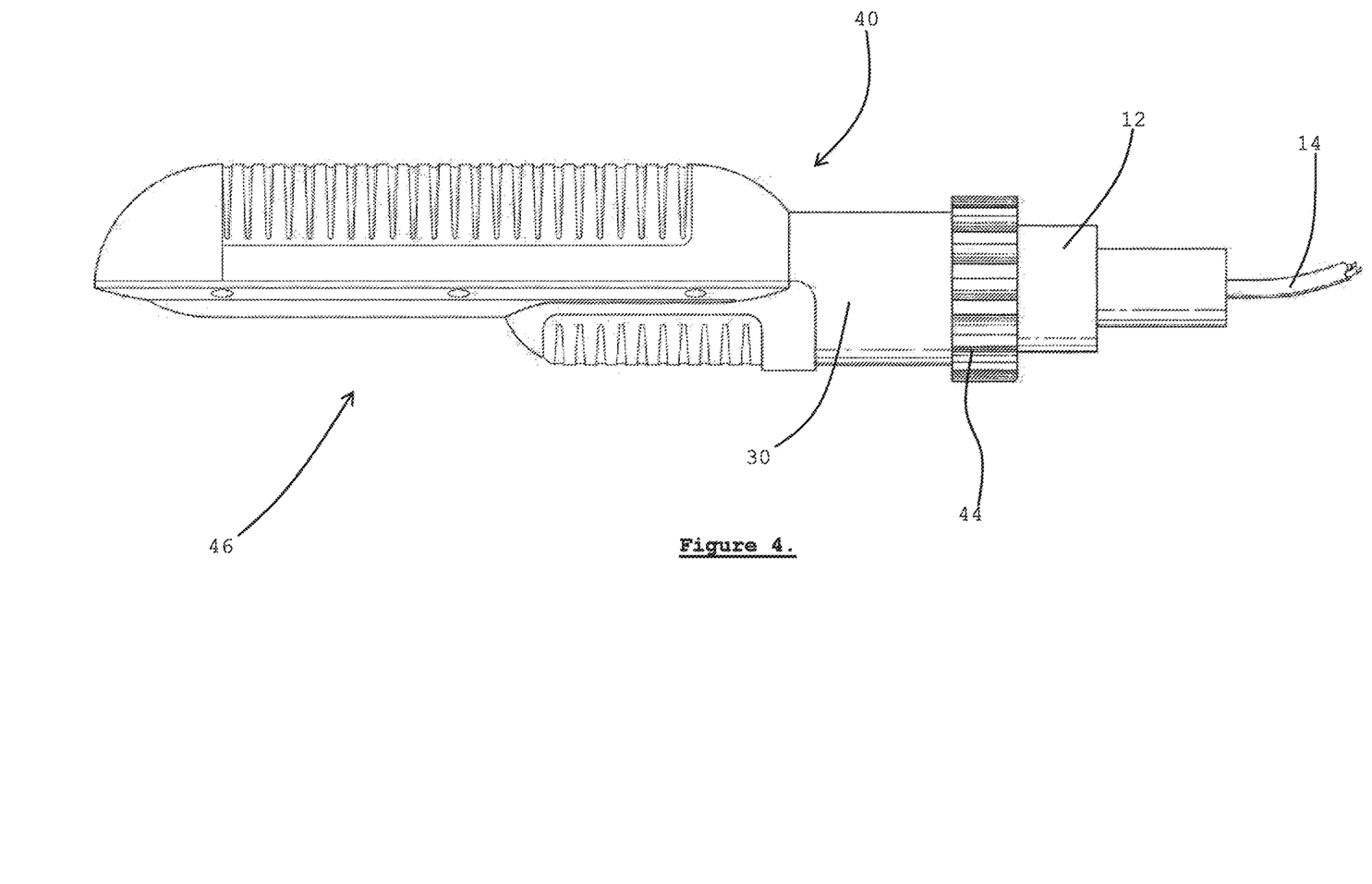
FIG. 4 is a diagrammatic side-view representation of an example of a light fitting comprising and electrical connector in accordance with aspects of the present invention.
Figure 5:
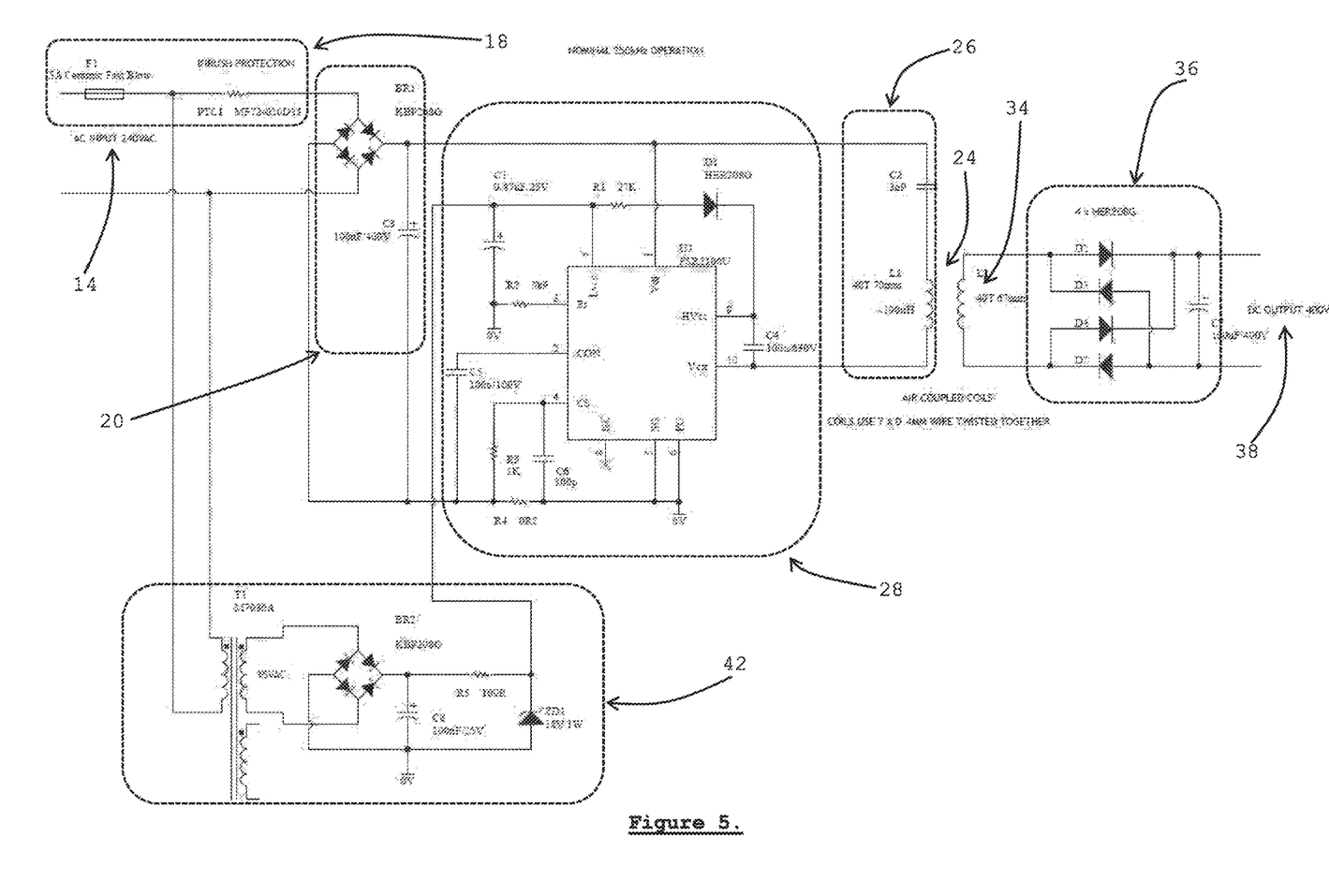
FIG. 5 is a diagrammatic representation of an example circuit diagram of an embodiment of the electrical connector in accordance with aspects of the present invention.

Further features of the present invention are more fully described in the following description of several non-limiting embodiments thereof. This description is included solely for the purposes of exemplifying the present invention to the skilled addressee. It should not be understood as a restriction on the broad summary, disclosure or description of the invention as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee. For example, concepts well-known in the art of electrical and electronic engineering, such as AC, DC, waveforms, switching mode power supplies, etc. used herein will not be described in detail as such concepts are deemed within the understanding of the skilled addressee.

Broadly, the present invention provides for an electrical connector 10 intended to provide an isolated and intrinsically safe AC coupling for use primarily on pole mounted LED and related lighting fixtures. The connector 10 generally employs electromagnetic coupling for power transfer with the goal of eliminating the need for physical electrical contacts to feed power to the lighting fixture from a mains electrical supply 16.

The connector 10 is intended to electrically isolate the mains supply 16 from the load 40 in order to remove otherwise hazardous voltages and the need to isolate an entire circuit to replace the lamp or lamp fixture (as the load 40) in the case of lamp failure or maintenance, as described above.

The connector 10 generally utilises switched mode power supply (SMPS) technology to provide conversion of the AC input 16 on the supply side, to DC on the load side. The DC voltage on the load side is converted back to an appropriate AC voltage and frequency utilising AC inverter circuitry, as described below. The connector 10 is intended to support at least 200 Watts of (resistive load) power into the load, as well as allowing the connector 10 to work in various regions throughout the world, supporting 110, 220, 230 and 240 volt 50/60 Hz nominal voltage and frequency electrical systems. The connector 10 is also intended to handle reactive loads such as HID, halide and sodium lamp loads, which can be highly reactive if not electronically ballasted.

With reference now to the accompanying figures, there is shown an embodiment of such an electrical connector 10, which broadly comprises a supply side housing 12 and a load side housing 30. The skilled addressee will appreciate that both the supply and load side housings 12 and 30 are generally electrically sealed such that no electrical connector is open or exposed to the outside atmosphere when the connector 10 is used.

The supply side housing 12 generally comprises an AC input 14 with input protection 18 for receiving an AC supply 16. The AC input 14 is typically configured to receive an AC supply between 95-250 VAC to accommodate a variety of electrical systems. However, these indicated voltage ranges are non-exhaustive and variations hereon are possible and within the scope of the present invention. The input protection 18 generally comprises a fuse, an inrush current limiting thermistor and/or a metal oxide varistor. In an embodiment, input protection 18 includes a time delay mains-rated ceramic fuse for overall circuit protection, followed by an NTC inrush current limiting thermistor that limits the current into the filter capacitor when power is applied to the input. A Metal Oxide Varistor (MOV) is also incorporated to capture mains power borne transients in order to protect the circuitry.

In an embodiment, the AC input 14 includes an electromagnetic interference (EMI) filter 42 to mitigate EMI from the resonant converter arrangement 28 (described below) back into the AC supply 16. Typically, the EMI filter 42 comprises a common-mode choke arrangement.

The supply side housing 12 also includes a primary rectifier arrangement 20 which is configured to rectify the AC input 14 to a DC input. In an embodiment, the primary rectifier arrangement 20 comprises a bridge rectifier and electrolytic capacitor. These components are typically rated so as to provide a safety margin over a nominal 250-Watt load rating.

The supply side housing 12 also defines a female socket 22, as shown, having a single layer air-cored supply coil 24 sealed within the socket 22, with a capacitor arranged in series with the supply coil 24 to form a series resonant LC arrangement 26. Also included is a half-bridge resonant converter switched mode power supply arrangement 28 supplied from the DC input and driving the supply coil 24 to produce a symmetrical AC waveform. The converter arrangement 28 is configured with a switching frequency substantially matched to a resonant frequency of the series resonant LC arrangement 26.

A half bridge resonant topology is typically utilised for the converter arrangement 28 in order to reduce potential EMC/EMI issues. Electromagnetic coupling between the supply and load coils 24 and 34 forms an 'air-cored' coupling transformer. The plug and socket 32 and 22 housing the supply and load coils 24 and 34 fits together, i.e. a secondary winding will be inserted into the primary winding when the plug and socket are joined together.

In an embodiment, the connector 10 includes a fastener 44 for securing the supply and load side housings 12 and 30 together so that the plug 32 is complementarily engaged within the socket 22 to facilitate power transfer. In the exemplified embodiment, the fastener comprises a threaded locking ring which secures the housings together, as shown, but variations hereon are possible.

In one embodiment, the FSFR2100U™ is used to realise the converter arrangement 28, and is a 400-watt offline SMPS IC with inbuilt MOSFET half bridge output. It is designed for use in series resonant LC situations, where a pulse width modulated drive is applied to the primary of a transformer resonated with a capacitor connected in series. Being resonant has the advantage of markedly reducing RFI/EMI emissions. This is because the resonant LC primary inherently and effectively 'filters' fast switching transients (high frequency components) found in rectangular drive waveforms to produce a near sine wave. The switching frequency of the controller is closely matched to the resonant frequency of the primary LC.

A half bridge output is necessary to drive the series resonant LC arrangement 26 to achieve a symmetrical waveform. The drive to the series resonant LC arrangement 26 is derived from the half-bridge output on the FSFR2100U. The square-wave drive is generated with a small 'dead-band', so that both outputs of the FSFR2100U device does not conduct simultaneously. The square wave drive is converted to a near sine wave by the series resonant LC arrangement 26. Being driven in 'push-pull' results in a symmetrical waveform that can be easily coupled to and rectified by the load coil 34, as described below. The resonant converter arrangement 28 typically drives the supply coil 24 via pulse width modulation. The switching frequency of the resonant converter arrangement 28 is generally in a range of 150 kHz to several megahertz, requirements depending. In general, faster switching frequencies useable for differing topologies and semiconductor devices allow the use of coils with fewer turns, i.e. a more compact connector 10.

The load side housing 30 comprises a male plug 32 configured to fit inside the female socket 22 and having a single layer air-cored load coil 34 sealed within the plug 32. Load side housing 30 also includes and a secondary rectifier arrangement 36 which is configured to rectify an AC waveform induced within the load coil 34 to produce a DC output for supply to a load 40.

In general, the coils 24 and 34 are cylindrical single layer air-cored coils sized so that one fits inside of the other forming a transformer. The coils 24 and 24 are coupled when the plug 32 and socket 22 are fitted together. A thickness of the plug 32 and socket 22 is generally kept to a minimum required to provide the requisite electrical insulation and to achieve maximum coupling between the coils 24 and 34. In this manner, the supply and load side housings 12 and 30 are complementarily engageable via the plug 32 and socket 22 so that electrical power transfer is facilitated from the AC input 14 to the DC output 38 through electromagnetic induction via the sealed coils.

The secondary rectifier arrangement 36 generally comprises a fast-recovery diode bridge with suitable capacitor. Because of the high switching frequency employed by the resonant converter arrangement 28, a standard bridge rectifier cannot be used. Rectification is accomplished by utilizing fast recovery rectifier diodes. The electrolytic capacitor is a low ESR type to reduce losses.

In an embodiment, the secondary rectifier arrangement 36 includes tracking circuitry configured to automatically track a magnitude and/or frequency of the AC supply 16. Similarly, in an embodiment, the resonant converter arrangement 28 includes load detection circuitry configured to detect if the load coil 34 is in electromagnetic induction registry with the supply coil 24 in order to activate or deactivate the resonant converter arrangement 28 accordingly. Accordingly, in an embodiment, the resonant converter switched mode power supply arrangement 28 may be configured to automatically and continuously monitor and adjust the switching frequency to maintain maximum power transfer to the secondary rectifier arrangement 36.

In an embodiment, the supply and/or load side housings are manufactured from a polymer material having suitable thermal conductivity to facilitate heat dissipation from the connector 10. In an embodiment, the supply and/or load side housings define heat dissipation structures thereon, such as ribs or fins, to facilitate heat dissipation from the connector 10. In general, air-coupled coils have a lower power transfer efficiency end to end compared to a closely coupled conventionally 'cored' transformer, which typically achieves 90% efficiency or better. This lower efficiency may result in more heat being generated that needs to be dissipated by the connector 10. To overcome this issue, a plastic with higher thermal conductivity may need to be employed and the enclosure ribbed or finned to increase surface area for heat dissipation.

Typically, the load 40 comprises a lighting arrangement 46, such as a light emitting diode (LED) lighting arrangement, a high intensity discharge (HID) lighting arrangement, a halide and/or sodium lamp. Of course, other loads may be apposite and are included within the scope of the present invention.

Applicant regards it as advantageous that the electrical connector 10 of the present invention allows power transfer from an AC source to a DC load without direct electrical contact. As a result, the connector 10 can be used to connect load 40 to an electrical supply without requiring electrical isolation as open or unsealed electrical connectors are not exposed to the atmosphere.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the invention, or similar exemplary language (e.g., "such as") herein, is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. An electrical connector comprising:
   a supply side housing comprising:
   i) an AC input with input protection for receiving an AC supply;
   ii) a primary rectifier arrangement configured to rectify the AC input to a DC input;
   iii) a female socket having a single layer air-cored supply coil sealed within the socket, a capacitor arranged in series with the supply coil to form a series resonant LC arrangement; and
   iv) a half-bridge resonant converter switched mode power supply arrangement supplied from the DC input and driving the supply coil to produce a symmetrical AC waveform, said converter configured with a switching frequency substantially matched to a resonant frequency of the series resonant LC arrangement; and
   a load side housing comprising:
   a) a male plug configured to fit inside the female socket and having a single layer air-cored load coil sealed within said plug; and
   b) a secondary rectifier arrangement configured to rectify an AC waveform induced within the load coil to produce a DC output for supply to a load;
   wherein the supply and load side housings are complementarily engageable via the plug and socket so that electrical power transfer is facilitated from the AC input to the DC output through electromagnetic induction via the sealed supply and load coils;
   wherein the supply and/or load side housings are manufactured from a polymer material having suitable thermal conductivity to facilitate heat dissipation from the connector;
   wherein the supply and/or load side housings define heat dissipation structures thereon, such as ribs or fins, to facilitate heat dissipation from the connector;
   wherein the resonant converter switched mode power supply arrangement is configured to automatically and continuously monitor and adjust the switching frequency to maintain maximum power transfer to the secondary rectifier arrangement.

2. The connector of claim 1, wherein both the supply and load side housings are electrically sealed such that no electrical connector is open or exposed to the outside atmosphere when the connector is used.

3. The connector of claim 1, wherein the AC input is configured to receive an AC supply between 95-250 VAC.

4. The connector of claim 1, wherein the input protection comprises a fuse, an inrush current limiting thermistor and/or a metal oxide varistor.

5. The connector of claim 1, wherein the AC input includes an electromagnetic interference (EMI) filter to mitigate EMI from the resonant converter arrangement back into the AC supply.

6. The connector of claim 5, wherein the EMI filter comprises a common-mode choke arrangement.

7. The connector of claim 1, wherein the primary rectifier arrangement comprises a diode bridge rectifier with capacitor.

8. The connector of claim 1, wherein the resonant converter arrangement drives the supply coil via pulse width modulation.

9. The connector of claim 1, wherein the switching frequency of the resonant converter arrangement is in a range of 150 kHz to several megahertz.

10. The connector of claim 1, wherein the secondary rectifier arrangement comprises a fast-recovery diode bridge with capacitor.

11. The connector of claim 1, wherein the secondary rectifier arrangement includes tracking circuitry configured to automatically track a magnitude and/or frequency of the AC supply.

12. The connector of claim 1, wherein the resonant converter arrangement includes load detection circuitry configured to detect if the load coil is in electromagnetic induction registry with the supply coil in order to activate or deactivate the resonant converter arrangement accordingly.

13. The connector of claim 1, which includes a fastener for securing the supply and load side housings together so that the plug is complementarily engaged within the socket to facilitate power transfer.

14. The connector of claim 1, wherein the load comprises a lighting arrangement, such as a light emitting diode (LED) lighting arrangement, a high intensity discharge (HID) lighting arrangement, a halide and/or sodium lamp.

15. A light fitting comprising and electrical connector comprising:
a supply side housing comprising:
i) an AC input with input protection for receiving an AC supply;
ii) a primary rectifier arrangement configured to rectify the AC input to a DC input;
iii) a female socket having a single layer air-cored supply coil sealed within the socket, a capacitor arranged in series with the supply coil to form a series resonant LC arrangement; and
iv) a half-bridge resonant converter switched mode power supply arrangement supplied from the DC input and driving the supply coil to produce a symmetrical AC waveform, said converter configured with a switching frequency substantially matched to a resonant frequency of the series resonant LC arrangement; and
a load side housing comprising:
a) a male plug configured to fit inside the female socket and having a single layer air-cored load coil sealed within said plug; and
b) a secondary rectifier arrangement configured to rectify an AC waveform induced within the load coil to produce a DC output for supply to a lighting arrangement,
wherein the supply and load side housings are complementarily engageable via the plug and socket so that electrical power transfer is facilitated from the AC input to the DC output through electromagnetic induction via the sealed supply and load coils;
wherein the supply and/or load side housings are manufactured from a polymer material having suitable thermal conductivity to facilitate heat dissipation from the connector;
wherein the supply and/or load side housings define heat dissipation structures thereon, such as ribs or fins, to facilitate heat dissipation from the connector;
wherein the resonant converter switched mode power supply arrangement is configured to automatically and continuously monitor and adjust the switching frequency to maintain maximum power transfer to the secondary rectifier arrangement.

* * * * *